US010094468B2

(12) United States Patent
Ohki et al.

(10) Patent No.: US 10,094,468 B2
(45) Date of Patent: Oct. 9, 2018

(54) MANUAL TRANSMISSION FOR VEHICLE

(71) Applicant: TOYOTA JIDOSHA KABUSHIKI KAISHA, Toyota-shi, Aichi-ken (JP)

(72) Inventors: Takao Ohki, Toyota (JP); Yasuhiro Hada, Toyota (JP); Yoshitaka Furuta, Nishio (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/407,654

(22) Filed: Jan. 17, 2017

(65) Prior Publication Data
US 2017/0219090 A1 Aug. 3, 2017

(30) Foreign Application Priority Data

Jan. 28, 2016 (JP) ................... 2016-014921

(51) Int. Cl.
*F16H 59/04* (2006.01)
*F16H 61/24* (2006.01)
*F16H 59/02* (2006.01)

(52) U.S. Cl.
CPC ............. *F16H 59/04* (2013.01); *F16H 61/24* (2013.01); *F16H 2059/0295* (2013.01); *F16H 2061/246* (2013.01)

(58) Field of Classification Search
CPC .... F16H 59/04; F16H 61/24; F16H 2061/246; F16H 2059/0295
USPC ........ 74/473.29, 473.33, 525, 544, 546, 548
See application file for complete search history.

(56) References Cited

U.S. PATENT DOCUMENTS

| 5,036,722 | A | * | 8/1991 | Park | F16H 61/18 74/473.22 |
| 5,727,424 | A | | 3/1998 | Brandewie et al. | |
| 5,758,543 | A | * | 6/1998 | Bair | F16H 59/04 74/473.1 |
| 5,927,151 | A | * | 7/1999 | Alber | F16C 11/0619 74/473.29 |
| 7,228,753 | B2 | * | 6/2007 | Kim | F16H 61/36 74/473.1 |
| 9,003,917 | B2 | * | 4/2015 | Geberth | F16H 59/04 74/473.33 |
| 2012/0297914 | A1 | * | 11/2012 | Nehmeyer | F16F 7/116 74/473.29 |

(Continued)

FOREIGN PATENT DOCUMENTS

| EP | 1717490 A2 | 11/2006 |
| JP | H07-71569 A | 3/1995 |
| JP | 2006-308018 A | 11/2006 |

*Primary Examiner* — Victor L MacArthur
(74) *Attorney, Agent, or Firm* — Oliff PLC

(57) ABSTRACT

When a shift lever is moved to a shift position corresponding to a first gear position etc., the shift lever is urged by its own weight to a neutral position, which is disadvantageous for the shift lever in terms of gear slip-out after shifting. However, a counter mass is moved to a position reached by turning a second predetermined angle, larger than a first predetermined angle corresponding to the neutral position, downward with respect to a vertical line passing through a center of turn of the counter mass. Meanwhile, the shift lever is urged by the weight of the counter mass in the direction away from the neutral position, so that gear slip-out after shifting can be prevented.

2 Claims, 2 Drawing Sheets

(56) References Cited

U.S. PATENT DOCUMENTS

| | | | |
|---|---|---|---|
| 2013/0220051 A1* | 8/2013 | Geberth | F16H 59/04 |
| | | | 74/473.3 |
| 2015/0167842 A1* | 6/2015 | Son | F16H 61/24 |
| | | | 74/335 |
| 2016/0153555 A1* | 6/2016 | Maitre | F16H 61/36 |
| | | | 74/473.15 |

* cited by examiner

MANUAL TRANSMISSION FOR VEHICLE

INCORPORATION BY REFERENCE

The disclosure of Japanese Patent Application No. 2016-014921 filed on Jan. 28, 2016 including the specification, drawings and abstract is incorporated herein by reference in its entirety.

BACKGROUND

1. Technical Field

The present embodiment relates to a manual transmission that shifts gears as a shift lever is shifted.

2. Description of Related Art

There is a known manual transmission for a vehicle that includes a shift lever configured to be shifted by a driver, a shift mechanism provided between the shift lever and a gear mechanism and configured to transmit shifting of the shift lever to the gear mechanism, and a counter mass provided in the shift mechanism and turning according to the shift position of the shift lever. One example is the vehicle manual transmission of Japanese Patent Application Publication No, 7-71569. According to JP 7-71569 A, when an engine 16 and a transmission 1 as a whole are displaced in a comparatively short time, an inertial force is exerted on a shift control system 2, so that the relative positional relation between the transmission 1 and the shift control system 2 changes. To prevent gear slip-out resulting from a shift fork switching rod 9 moving as an auxiliary link member 8 of the shift control system 2 swings relative to the transmission 1, a counter mass 12 that counteracts the inertial force of the shift control system 2 is connected through an arm member 11.

In the case where the shift lever is provided on an instrument panel, the shift lever can easily return from a predetermined gear position to a neutral position (hereinafter referred to as an N-position) under the influence of the gravity. In particular, when the direction in which the counter mass is urged by the gravity and the direction in which the shift lever moves to the N-position are the same, gear slip-out is likely to occur due to the influence of gravity.

SUMMARY

The present embodiment provides a structure of a manual transmission that can prevent gear slip-out after shifting.

According to an aspect of the present embodiment, there is provided a manual transmission for a vehicle, the manual transmission includes: a shift lever shifted by a driver; a shift mechanism provided between the shift lever and a gear mechanism, the shift mechanism transmitting shifting of the shift lever to the gear mechanism; and a counter mass provided in the shift mechanism, the counter mass being configured such that the position of the center of gravity of the counter mass changes in a vertical direction as the counter mass turns according to shifting of the shift lever, the shift lever being configured such that, when a predetermined gear position is established, the shift lever at a first shift position is urged by the gravity to a neutral position, the counter mass being configured such that, when the shift lever is moved to the neutral position, the counter mass is turned a first predetermined angle downward with respect to a vertical line passing through the center of turn of the counter mass, the counter mass being configured such that, when the shift lever is moved to the first shift position, the counter mass is turned a second predetermined angle with respect to the vertical line in the same direction as the turning direction of the first predetermined angle, the second predetermined angle being an angle larger than the first predetermined angle, the counter mass being configured such that, when the shift lever is moved from the first shift position to a second shift position that corresponds to a gear position on the opposite side with respect to the neutral position, the counter mass is turned a third predetermined angle downward with respect to the vertical line in the opposite direction from the turning direction of the first predetermined angle.

In the above aspect of the present embodiment, the shift lever may be configured such that, when the shift lever is shifted from the first shift position to the second shift position, the shift lever is located on a vertically lower side than the neutral position.

According to the manual transmission for a vehicle in the above aspect of the present embodiment, when the shift lever is moved to the first shift position corresponding to the predetermined gear position, the shift lever is urged by its own weight to the neutral position, which is disadvantageous in terms of gear slip-out after shifting. However, the counter mass is turned the second predetermined angle, larger than the first predetermined angle, downward with respect to the vertical line passing through the center of turn of the counter mass. Meanwhile, the shift lever is urged by the weight of the counter mass in the direction away from the neutral position, so that gear slip-out after shifting can be prevented.

When the shift lever is moved from the first shift position to the second shift position that corresponds to the gear position on the opposite side with respect to the neutral position, the counter mass is turned the third predetermined angle downward, with respect to the vertical line passing through the center of turn of the counter mass, in the opposite direction from the turning direction corresponding to the neutral position of the shift lever. Thus, the shift lever is urged by the weight of the counter mass in the direction away from the neutral position, so that gear slip-out after shifting can be prevented.

According to the manual transmission for a vehicle in the above aspect of the present embodiment, when the shift lever is shifted from the first shift position to the second shift position, the shift lever is located further on the vertically lower side than the neutral position, so that the shift lever is urged by its own weight in the direction away from the neutral position. Thus, gear slip-out after shifting can also be prevented by the weight of the shift lever itself.

Here, the gear mechanism is configured to be able to shift gears of six forward speeds and one reverse speed. The predetermined gear position corresponds to the first gear position, the third gear position, the fifth gear position, and the reverse gear position. The gear position on the opposite side from the predetermined gear position with respect to the neutral position corresponds to the second gear position, the fourth gear position, and the sixth gear position.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described in detail below with reference to the drawings. In the following embodiment, the drawings are simplified or deformed as appropriate, and the dimensional ratios, shapes, etc. of the parts depicted are not necessarily exact.

Figure 1:
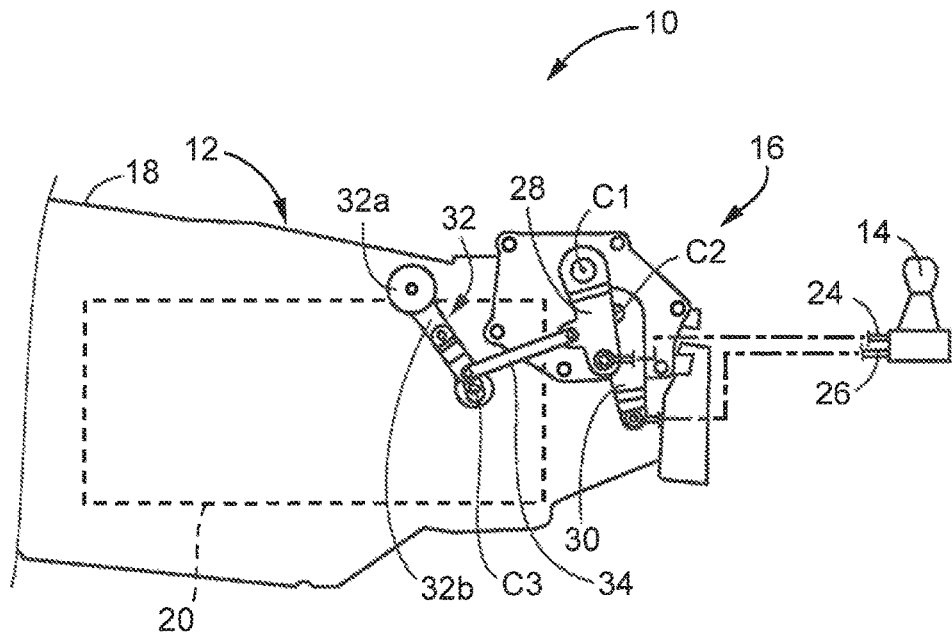
FIG. 1 is an overall view of a manual transmission installed in a vehicle employing the present embodiment.

FIG. 1 shows the overall structure of a manual transmission 10 installed in a vehicle suitably employing the present embodiment. The manual transmission 10 is a parallel two-shaft stepped transmission that selectively establishes a plurality of gear positions as a shift lever 14 is (manually) shifted by a driver, and thereby outputs a rotation input from an engine (not shown) after decelerating or accelerating the rotation at a predetermined gear ratio γ.

The manual transmission 10 includes a transmission mechanism 12, the shift lever 14 (manually) shifted by a driver, and a shift mechanism 16 provided between the transmission mechanism 12 and the shift lever 14 and mechanically coupling these two together.

The transmission mechanism 12 includes a gear mechanism 20 indicated by the dashed line inside a case 18. The gear mechanism 20 includes a plurality of gear pairs that are constantly in mesh with each other between two rotating shafts. As a gear pair corresponding to a gear position to be established is connected so as to be able to transmit power between the rotating shafts, for example, one gear position among six forward gear positions, from the first "1st" to the sixth "6th", and one reverse gear position "Rev" is established. That is, when the shift lever 14 is shifted to a shift position corresponding to a gear position, the gear mechanism 20 is shifted to the selected gear position. When the shift lever 14 is shifted to the neutral position where none of the gear positions is selected, the gear mechanism 20 is placed in a neutral state (power transmission interrupted state). Thus, the manual transmission 10 is that of a manual transmission vehicle (MT vehicle) fitted with the transmission mechanism 12 that selectively establishes a plurality of gear positions as the shift lever 14 is shifted by a driver.

The shift mechanism 16 that transmits shifting of the shift lever 14 to the gear mechanism 20 is provided between the shift lever 14 and the transmission mechanism 12. The shift mechanism 16 includes: a shift cable 24 through which an operation of the shift lever 14 in a shift direction (vehicle forward-backward direction) is transmitted to the gear mechanism 20; a select cable 26 through which an operation of the shift lever 14 in a select direction (vehicle width direction) is transmitted to the gear mechanism 20; a first turning member 28 that is coupled to the shift cable 24 and turned according to an operation of the shift lever 14 in the shift direction; and a second turning member 30 that is coupled to the select cable 26 and turned according to an operation of the shift lever 14 in the select direction.

When the shift lever 14 is operated in the shift direction, the first turning member 28 is turned around a center of turn C1 through the shift cable 24. When the shift lever 14 is operated in the select direction, the second turning member 30 is turned around a center of turn C2 through the select cable 26. As the first turning member 28 and the second turning member 30 are turned according to shifting of the shift lever 14, the turning motion is transmitted to the gear mechanism 20, and the gear mechanism 20 is shifted to the gear position according to the shifting of the shift lever 14.

The shift mechanism 16 includes a counter mass 32 that turns around a center of turn C3 according to an operation of the shift lever 14 in the shift direction. The counter mass 32 is composed of a mass body 32a and a coupling member 32b. The mass body 32a has a sufficiently large mass compared with the coupling member 32b. One end of the coupling member 32b in the longitudinal direction is coupled to the mass body 32a, while the other end of the coupling member 32b in the longitudinal direction can turn around the center of turn C3. Thus, the position of the center of gravity of the counter mass 32 and the position of the counter mass body 32a in the vertical direction change as the counter mass 32 turns around the center of turn C3 according to an operation of the shift lever 14 in the shift direction. The counter mass 32 is located further on the vertically upper side than the center of turn C3 within the turnable range.

A power transmission member 34 is connected to the coupling member 32b at a position in the vicinity of the center of turn C3. One end of the power transmission member 34 is connected to the coupling member 32b, while the other end is connected to the first turning member 28. Accordingly, when the shift lever 14 is operated in the shift direction, the first turning member 28 is turned, which in turn causes the counter mass 32 to turn around the center of turn C3 through the power transmission member 34. Meanwhile, the position of the counter mass 32 in the vertical direction changes.

Figure 2A:
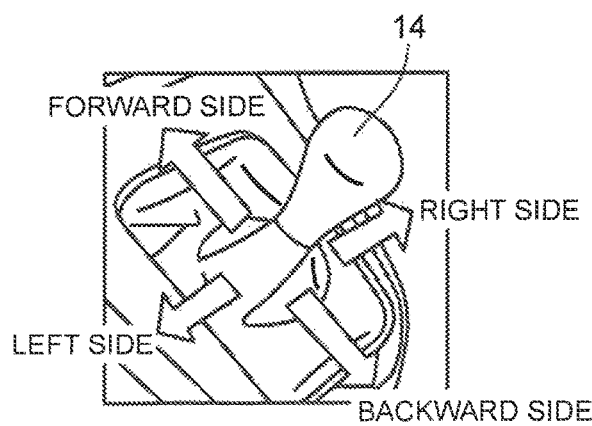
FIG. 2A is a view showing the external appearance of a shift lever and FIG. 2B is a view showing the shift pattern of the shift lever.
Figure 2B:
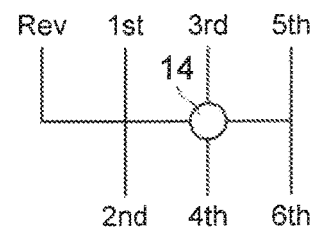

FIG. 2A shows the external appearance of the shift lever 14, and FIG. 2B shows the shift pattern of the shift lever 14. As shown in FIG. 2A, the shift lever 14 is configured to be movable in the vehicle forward-backward direction and the left-right direction (vehicle width direction). An operation of the shift lever 14 in the vehicle forward-backward direction and an operation of the shift lever 14 in the vehicle width direction correspond respectively to an operation in the shift direction and an operation in the select direction.

For example, if the shift lever 14 is moved toward the left side in the select direction in FIG. 2A, the shift lever 14 is moved toward the reverse gear position (Rev) in FIG. 2B. If the shift lever 14 is moved toward the right side in the select direction, the shift lever 14 is moved toward the fifth gear position (5th) and the sixth gear position (6th) in FIG. 2B. If the shift lever 14 is moved toward the forward side in the shift direction in FIG. 2A, the shift lever 14 is moved toward the reverse gear position (Rev), the first gear position (1st), the third gear position (3rd), and the fifth gear position (5th) in FIG. 2B. If the shift lever 14 is moved toward the backward side in the shift direction in FIG. 2A, the shift lever 14 is moved toward the second gear position (2nd), the fourth gear position (4th), and the sixth gear position (6th) in FIG. 2B. The position of the shift lever 14 at the center in the vehicle front-rear direction as indicated in FIG. 2B corresponds to the neutral position (power transmission interrupted position) of the shift lever 14. In this embodiment, the gear position on the opposite side from the first gear position (1st) with respect to the neutral position is the second gear position (2nd); the gear position on the opposite side from the third gear position (3rd) with respect to the neutral position is the fourth gear position (4th); and the gear position on the opposite side from the fifth gear position (5th) with respect to the neutral position is the sixth gear position (6th).

Figure 3:
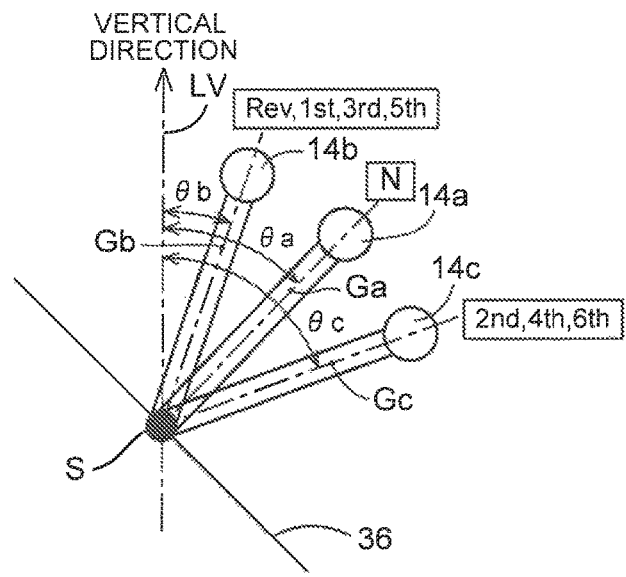
FIG. 3 is a view schematically showing the positions of the shift lever of FIG. 2A and FIG. 2B in a shift direction.

FIG. 3 is a view schematically showing the positions of the shift lever 14 in the shift direction. The shift lever 14 is provided on an instrument panel 36, and is configured to be turnable around a support point S provided at the vertically lower end of the shift lever 14 in the longitudinal direction. The neutral position of the shift lever 14 corresponds to an N-position 14a of the shift lever, at which the shift lever 14 is inclined at a predetermined angle θa with respect to a vertical line LV indicated by the one-dot dashed line that passes through the support point S and extends in the vertical direction.

A first shift position 14b of the shift lever corresponds to the state of being shifted to the first gear position (1st), the third gear position (3rd), the fifth gear position (5th), and the reverse gear position (Rev). In this state, the shift lever is inclined at a predetermined angle θb with respect to the vertical line LV indicated by the one-dot dashed line. Here, since the absolute value of the predetermined angle θb is smaller than the absolute value of the predetermined angle θa, a center of gravity Gb of the shift lever at the first shift position 14b is located further on the vertically upper side than a center of gravity Ga of the shift lever at the N-position 14a. Accordingly, the shift lever at the first shift position 14b is urged by its own weight toward the N-position 14a of the shift lever corresponding to the neutral position. That is, the weight of the shift lever 14 acts in the direction in which gear slip-out occurs after shifting. The term gear slip-out in this embodiment refers to a phenomenon that power transmission by meshing gears of the gear mechanism 20, which have been in a power transmission state, is interrupted as the shift lever 14 moves to the neutral position after shifting. The first gear position (1st), the third gear position (3rd), the fifth gear position (5th), and the reverse gear position (Rev) correspond to the predetermined gear position in the present embodiment.

A second shift position 14c of the shift lever corresponds to the state of being shifted to the second gear position (2nd), the fourth gear position (4th), and the sixth gear position (6th). In this state, the shift lever is inclined at a predetermined angle θc with respect to the vertical line LV indicated by the one-dot dashed line. Here, since the absolute value of the predetermined angle θc is larger than the absolute value of the predetermined angle θa, a center of gravity Gc of the shift lever at the second shift position 14c is located further on the vertically lower side than the center of gravity Ga of the shift lever at the N-position 14a that is the neutral position. Accordingly, the shift lever at the second shift position 14c is urged by its own weight to the opposite side from the N-position 14a of the shift lever. That is, gear slip-out is prevented as the weight of the shift lever itself acts in the direction of preventing gear slip-out after shifting. The second gear position (2nd), the fourth gear position (4th), and the sixth gear position (6th) correspond to the gear position on the opposite side from the predetermined gear position with respect to the neutral position in the present embodiment.

Figure 4:
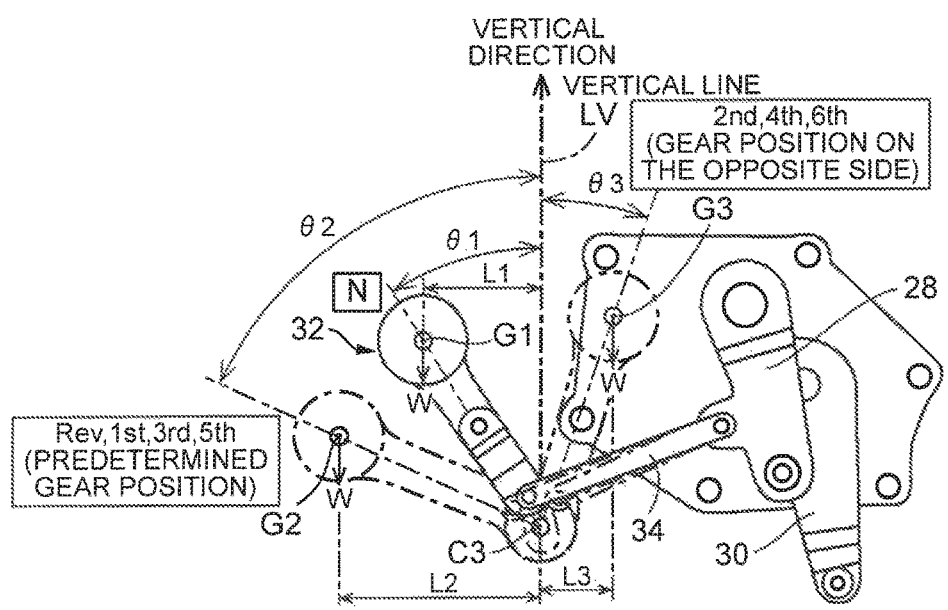
FIG. 4 is a view showing the positions of a counter mass that works in conjunction with the shift lever in the shift mechanism of FIG. 1.

FIG. 4 shows the positions of the counter mass 32 that works in conjunction with the shift lever 14 in the shift mechanism 16 of FIG. 1. Although the first turning member 28 is turned in conjunction with the shift lever 14, FIG. 4 shows the first turning member 28 only in the state where the shift lever 14 is at the neutral position. As shown in FIG. 4, the counter mass 32 is provided so as to be turnable around the center of turn C3 that is provided at the other end of the counter mass 32 in the longitudinal direction relative to the mass body 32a provided at the one end of the counter mass 32. The center of turn C3 is always located further on the vertically lower side than the mass body 32a within the turnable range of the counter mass 32.

The counter mass 32 indicated by the solid line shows the state where the shift lever 14 is moved to the neutral position (the N-position 14a of the shift lever in FIG. 3). In this case, the counter mass 32 is turned a first predetermined angle θ1 downward in the counterclockwise direction, with respect to the vertical line LV passing through the center of turn C3, in a plane orthogonal to the center of turn C3. In addition, a moment M1, calculated as the product of a distance L1 between a position of the center of gravity G1 of the counter mass 32 and the vertical line LV and a weight W (own weight W) of the counter mass 32 (=L1×W), acts in the counterclockwise direction at the center of turn C3 of the counter mass 32.

The counter mass 32 indicated by the one-dot dashed line shows the position when the shift lever 14 is shifted to a shift position corresponding to the first gear position (1st), the third gear position (3rd), the fifth gear position (5th), and the reverse gear position (Rev) (the first shift position 14b of the shift lever in FIG. 3). In this case, the counter mass 32 is turned a second predetermined angle θ2, larger than the first predetermined angle θ1, downward with respect to the vertical line LV passing through the center of turn C3, in the counterclockwise direction that is the same turning direction as the first predetermined angle θ1 corresponding to the neutral position with respect to the vertical line LV, in the plane orthogonal to the center of turn C3. In addition, a moment M2, calculated as the product of a distance L2 between a position of the center of gravity G2 of the counter mass 32 and the vertical line LV and the weight W of the counter mass 32 (=L2×W), acts in the counterclockwise direction at the center of turn C3 of the counter mass 32. Since the distance L2 is larger than the distance L1, the moment M2 is larger than the moment M1 acting with the shift lever 14 at the neutral position.

The counter mass 32 indicated by the two-dot dashed line shows the position when the shift lever 14 is shifted to the second gear position (2nd), the fourth gear position (4th), and the sixth gear position (6th) (the second shift position 14c of the shift lever in FIG. 3). In this case, the counter mass 32 is turned a third predetermined angle θ3 downward with respect to the vertical line LV passing through the center of turn C3 of the counter mass 32, in the clockwise direction that is the opposite direction from the turning direction of the first predetermined angle θ1 that is the turning angle of the counter mass 32 when the shift lever 14 is moved to the neutral position, in the plane orthogonal to the center of turn C3. In addition, a moment M3, calculated as the product of a distance L3 between a position of the center of gravity G3 of the counter mass 32 and the vertical line LV and the weight W of the counter mass 32 (=L3×W), acts in the clockwise direction at the center of turn C3 of the counter mass 32.

As described above, the second predetermined angle θ2 with respect to the vertical line LV is larger than the first predetermined angle θ1. Accordingly, the position of the center of gravity G2 of the counter mass 32 when the counter mass 32 has turned the second predetermined angle θ2 is located at a lower position in the vertical direction than the position of the center of gravity G1 when the counter mass 32 has turned the first predetermined angle θ1.

The third predetermined angle θ3 is smaller than the first predetermined angle θ1. Accordingly, the position of the center of gravity G3 of the counter mass 32 when the counter mass 32 has turned the third predetermined angle θ3 is located at a higher position in the vertical direction than the position of the center of gravity G1 when the counter mass 32 has turned the first predetermined angle θ1.

Thus, the position of the center of gravity G3 of the counter mass 32 when the counter mass 32 has turned the third predetermined angle θ3 is the highest in the vertical direction; the position of the center of gravity G1 of the counter mass 32 when the counter mass 32 has turned the first predetermined angle θ1 is the second highest; and the position of the center of gravity G2 of the counter mass 32 when the counter mass 32 has turned the second predetermined angle θ2 is the lowest in the vertical direction.

If the shift lever 14 is shifted from the neutral position to the first gear position (1st), the third gear position (3rd), the fifth gear position (5th), or the reverse gear position (Rev), the counter mass 32 turns from the position indicated by the solid line to the position indicated by the one-dot dashed line. Meanwhile, the position of the center of gravity G1 moves downward to the position G2 located on the vertically lower side, so that the counter mass 32 is swung downward from the vertically upper position. In this way, the potential energy is used to move the counter mass 32 downward, as well as the kinetic energy of the moving counter mass 32 is used, so that a good shift feeling can be maintained. Thus, the counter mass 32 can be effectively used.

Here, after the shift lever 14 has been shifted to the first gear position (1st), the third gear position (3rd), the fifth gear position (5th), or the reverse gear position (Rev), the shift lever 14 is urged by its own weight toward the neutral position (the side of gear slip-out) as shown in FIG. 3, which is disadvantageous on the side of the shift lever 14 in terms of gear slip-out.

However, as shown in FIG. 4, since the position of the center of gravity G2 of the counter mass 32 is located further on the vertically lower side than the position of the center of gravity G1 of the counter mass 32 at the neutral position indicated by the solid line, the shift lever 14 is urged by the weight of the counter mass 32 in the opposite direction, with respect to the vertical line LV, from the turning direction of the first predetermined angle θ1 that is the turning angle of the counter mass 32, indicated by the solid line, when the shift lever 14 is moved to the neutral position. That is, gear slip-out after shifting is prevented as the shift lever 14 is urged by the weight of the counter mass 32 in the direction of preventing gear slip-out after shifting. The mass of the counter mass 32 is set to be large enough to prevent gear slip-out after shifting by the weight of the counter mass 32 against the urging force of the weight of the shift lever 14 acting in the direction of gear slip-out.

To look at the moment, the moment M2 in the counterclockwise direction acts at the center of turn C3 of the counter mass 32. Here, a moment in the clockwise direction is required to move the counter mass 32 to the neutral position indicated by the solid line. However, the moment M2 acts in the opposite direction (counterclockwise direction), so that gear slip-out after shifting is prevented. Moreover, gear slip-out is prevented since the absolute value of the moment M2 is large.

If the shift lever 14 is shifted from the neutral position to the second gear position (2nd), the fourth gear position (4th), or the sixth gear position (6th), the counter mass 32 turns from the position indicated by the solid line to the position indicated by the two-dot dashed line. During this transition period when the counter mass 32 turns, the counter mass 32 passes through the vertical line LV passing through the center of turn C3. Here, the position at which the center of gravity of the counter mass 32 lies on the vertical line LV is defined as the highest position of the counter mass 32 in the vertical direction. As the counter mass 32 is turned the third predetermined angle θ3 from this position, the counter mass 32 is swung downward from the vertically upper position. In this way, the potential energy of the counter mass 32 moving downward from the highest position in the vertical direction is used, as well as the kinetic energy of the moving counter mass 32 is used, so that a good shift feeling can be maintained. Thus, the counter mass 32 can be effectively used.

After the shift lever 14 has been shifted to the second gear position (2nd), the fourth gear position (4th), or the sixth gear position (6th), gear slip-out is prevented as the weight of the shift lever 14 itself acts in the direction of preventing gear slip-out after shifting by its own weight as shown in FIG. 3.

Since the counter mass 32 is located at a lower position than the position on the vertical line LV (the highest position in the vertical direction) as shown in FIG. 4, the counter mass 32 is urged by its own weight in the direction of maintaining the position of the counter mass 32. That is, the counter mass 32 is urged in the direction of preventing gear slip-out after shifting.

To look at the moment, the moment M3 in the clockwise direction acts at the center of turn C3 of the counter mass 32, as the counter mass 32 is turned in the opposite direction from the turning direction of the first predetermined angle θ1 that is the turning angle of the counter mass 32 with respect to the vertical line LV when the shift lever 14 is moved to the neutral position. Here, a moment in the counterclockwise direction is required to move the counter mass 32 to the neutral position indicated by the solid line. However, the moment M3 acts in the opposite direction (clockwise direction), and thus acts in the direction of preventing gear slip-out after shifting. The absolute value of the moment M3 is smaller than the absolute value of the moment M2 acting when the shift lever is shifted to the first gear position (1st) etc. indicated by the one-dot dashed line. However, gear slip-out after shifting is prevented by both the shift lever 14 and the counter mass 32, as the shift lever 14 is urged in the direction of preventing gear slip-out as shown in FIG. 3.

As has been described above, according to this embodiment, if the shift lever 14 is moved to the shift position corresponding to the first gear position (1st), the third gear position (3rd), the fifth gear position (5th), or the reverse gear position (Rev), the shift lever 14 is urged by its own weight to the neutral position, which is disadvantageous for the shift lever 14 in terms of gear slip-out after shifting. However, the counter mass 32 is turned the second predetermined angle θ2, larger than the first predetermined angle θ1 corresponding to the neutral position, downward with respect to the vertical line LV passing through the center of turn C3 of the counter mass 32. Meanwhile, the shift lever 14 is urged by the weight of the counter mass 32 in the direction away from the neutral position, so that gear slip-out after shifting can be prevented.

According to this embodiment, if the shift lever 14 is moved to the shift position corresponding to the second gear position (2nd), the fourth gear position (4th), or the sixth gear position (6th), the counter mass 32 is turned the third predetermined angle θ3 downward in the opposite direction from the turning direction of the first predetermined angle θ1 that is the turning angle of the counter mass 32 with respect to the vertical line LV when the shift lever 14 is moved to the neutral position. Thus, gear slip-out after shifting can be prevented as the shift lever 14 is urged by the weight of the counter mass 32 in the direction away from the neutral position.

According to this embodiment, in the state where the shift lever 14 is shifted to the second gear position (2nd), the fourth gear position (4th), or the sixth gear position (6th), the shift lever 14 is located further on the vertically lower side than the neutral position. Accordingly, the shift lever 14 is urged by its own weight in the direction away from the neutral position. Thus, gear slip-out after shifting can be prevented by the weight of the shift lever 14 itself.

While the embodiment has been described in detail on the basis of the drawings, other aspects of the present embodiment are also applicable.

For example, in the above embodiment, if the shift lever 14 is shifted to the second gear position (2nd), the fourth gear position (4th), or the sixth gear position (6th), the counter mass 32 is turned the third predetermined angle $\theta 3$ downward in the opposite direction front the turning direction of the first predetermined angle $\theta 1$ that is the turning angle of the counter mass 32 with respect to the vertical line LV when the shift lever 14 is moved to the neutral position, and the absolute value of the third predetermined angle $\theta 3$ is smaller than the absolute value of the first predetermined angle $\theta 1$. However, it is not absolutely necessary that the absolute value of the third predetermined angle $\theta 3$ is smaller than the absolute value of the first predetermined angle $\theta 1$. In other words, in the above embodiment, the position of the center of gravity G3 of the counter mass 32 when the counter mass 32 has turned the third predetermined angle $\theta 3$ is located further on the vertically upper side than the position of the center of gravity G1 of the counter mass 32 when the counter mass 32 has turned the first predetermined angle $\theta 1$, but the position of the center of gravity G3 may be located further on the vertically lower side than the position of the center of gravity G1.

While the manual transmission 10 is a manual transmission capable of shifting gears of six forward speeds and one reverse speed in the above embodiment, the present embodiment is also applicable to manual transmissions having different numbers of gears, for example, manual transmissions with five forward speeds and one reverse speed. For example, the manual transmission may be such that, at the first gear position (1st), the third gear position (3rd), and the fifth gear position (5th), the shift lever 14 is moved to the first shift position 14*b* of the shift lever in FIG. 3, while the counter mass 32 is turned to the position indicated by the one-dot dashed line in FIG. 4, and at the second gear position (2nd), the fourth gear position (4th), and the reverse gear position (Rev), the shift lever 14 is moved to the second shift position 14*c* of the shift lever in FIG. 3, while the counter mass 32 is turned to the position indicated by the two-dot dashed line in FIG. 4.

The present embodiment is also applicable to manual transmissions capable of shifting gears of six forward speeds and one reverse speed in different shift patterns. For example, the manual transmission may be such that, at the first gear position (1st), the third gear position (3rd), and the fifth gear position (5th), the shift lever 14 is moved to the first shift position 14*b* of the shift lever in FIG. 3, while the counter mass 32 is turned to the position indicated by the one-dot dashed line in FIG. 4, and at the second gear position (2nd), the fourth gear position (4th), the sixth gear position (6th), and the reverse gear position (Rev), the shift lever 14 is moved to the second shift position 14*c* of the shift lever in FIG. 3, while the counter mass 32 is turned to the position indicated by the two-dot dashed line in FIG. 4. Similarly, in manual transmissions capable of shifting gears of five forward speeds and one reverse speed, for example, the shift pattern is not particularly limited.

While the counter mass 32 is connected to the first turning member 28 through the power transmission member 34 in the above embodiment, the counter mass 32 may be directly connected to the first turning member 28.

The foregoing is merely one embodiment, and other aspects of the present invention with various modifications and improvements made thereto on the basis of the knowledge of those skilled in the art can be implemented.

What is claimed is:

1. A manual transmission for a vehicle, the manual transmission comprising:
a shift lever configured to be shifted by a driver of the vehicle, the shift lever being selectable between a first shift position, a neutral position, and a second shift position, the shift lever being inclined in a first angle from a first vertical line when the first shift position is selected, the shift lever being inclined in a second angle from the first vertical line when the neutral position is selected, the shift lever being inclined in a third angle from the first vertical line when the second shift position is selected, and the first angle being the smallest and the third angle being the largest between the first angle, the second angle and the third angle, the first vertical line being a vertical line passing through a center of turn of the shift lever and extending vertically upward with respect to gravity;
a shift mechanism provided between the shift lever and a gear mechanism, the shift mechanism configured to transmit shifting of the shift lever to the gear mechanism; and
a counter mass provided in the shift mechanism,
the counter mass being inclined in a fourth angle from a second vertical line toward a first direction, when the shift lever is moved to the neutral position, the second vertical line being a vertical line passing through a center of turn of the counter mass and extending vertically upward with respect to gravity,
the counter mass being inclined in a fifth angle from the second vertical line toward the first direction, when the shift lever is moved to the first shift position, the fifth angle being an angle larger than the fourth angle, and
the counter mass being inclined in a sixth angle from the second vertical line toward a second direction opposite to the first direction, when the shift lever is moved from the first shift position to the second shift position.
2. The manual transmission for the vehicle according to claim 1, wherein the sixth angle is an angle larger than the fourth angle.

* * * * *